United States Patent [19]

Bauer

[11] Patent Number: 5,211,019

[45] Date of Patent: May 18, 1993

[54] ACTUATING UNIT FOR A HYDRAULIC AUTOMOTIVE VEHICLE BRAKE SYSTEM

[75] Inventor: Jürgen Bauer, Wiesbaden, Fed. Rep. of Germany

[73] Assignee: Alfred Teves GmbH, Frankfurt Am Main, Fed. Rep. of Germany

[21] Appl. No.: 671,760

[22] PCT Filed: May 21, 1990

[86] PCT No.: PCT/EP90/00815

§ 371 Date: Mar. 13, 1991

§ 102(e) Date: Mar. 13, 1991

[87] PCT Pub. No.: WO91/01236

PCT Pub. Date: Feb. 7, 1991

[30] Foreign Application Priority Data

Jul. 15, 1989 [DE] Fed. Rep. of Germany ....... 3923459

[51] Int. Cl.$^5$ .............................................. B60T 13/20
[52] U.S. Cl. ......................................... 60/550; 60/561; 60/589
[58] Field of Search ................. 60/546, 550, 551, 561, 60/589, 585; 91/369.1

[56] References Cited

U.S. PATENT DOCUMENTS

| | | | |
|---|---|---|---|
| 1,978,738 | 10/1934 | Bragg et al. | 91/369.1 |
| 2,767,548 | 10/1956 | Ayers | 60/589 |
| 2,934,042 | 4/1960 | Stelzer | 60/551 |
| 4,468,926 | 9/1984 | Hodkinson | 60/551 |
| 4,553,470 | 11/1985 | Shimazu | 60/551 |
| 5,044,161 | 9/1991 | Schiel et al. | 60/589 |

FOREIGN PATENT DOCUMENTS 2152610 8/1985 United Kingdom .

Primary Examiner—Edward K. Look
Assistant Examiner—F. Daniel Lopez
Attorney, Agent, or Firm—Robert P. Seitter; J. Gordon Lewis

[57] ABSTRACT

An actuating unit for hydraulic automotive vehicle brake systems, including a vacuum brake power booster, a master brake cylinder, and an operating element, configured to achieve a reduction of overall axial length and a simultaneous reduction of the weight and a relief of the booster housing from forces of reaction. The brake pedal (3) operating arm is interposed between the vacuum brake power booster (1) and the master brake cylinder engaging an axially extending member interconnecting a control valve piston and a master cylinder piston (2). The booster housing (10) and fluid reservoir (4) are mounted within the engine compartment while the master cylinder housing has a flange portion fixed to the splashwall and a main portion which projects out of the engine compartment through the splash wall, and into the passenger compartment. The hydraulic reaction forces are absorbed directly from the master cylinder housing into the splashwall rather than through the booster housing. Actuation of the fluid reservoir valves (40, 41) associated with the pressure chambers (14, 15) of the master brake cylinder (2) takes place simultaneously with the actuation of the control valve (13) located at one end of the booster housing of the vacuum brake power booster (1). Air required for venting of the power chamber (6) of the vacuum brake power booster (1) is drawn into the control valve from an intake formed on the control valve and projecting into the engine compartment of the vehicle.

18 Claims, 4 Drawing Sheets

ACTUATING UNIT FOR A HYDRAULIC AUTOMOTIVE VEHICLE BRAKE SYSTEM

INTRODUCTION

The invention is related to a brake actuating unit of a well known type comprised of a vacuum brake power booster and a tandem master cylinder mounted thereto The power booster housing is divided by a movable wall into a vacuum chamber and a power chamber which is ventable by means of a control valve being accommodated in a control valve housing fixed to the movable wall The master brake cylinder comprises two pressure chambers within a cylinder housing and has a connection to an unpressurized hydraulic fluid reservoir may be shut off or opened by means of two valves. A primary piston defines the first, primary pressure chamber, and is of two-part construction consisting of an external piston which is in power-transmitting connection with the booster movable wall, and of an internal piston which is sealedly guided within the external pisto.n The internal piston is slidable to a limited extent relative to the external piston, and is directly actuatable by an operating element comprised of the actuating brake pedal, the internal piston integral with a valve piston actuating the booster control valve.

BACKGROUND OF THE INVENTION

An actuating unit of this kind has already become known by the German patent application published without examination, No. 3,401,402. It is the special feature of this state-of-the-art actuating unit that the valve piston sealedly passes through a wall of the master brake cylinder and in the event of an actuation is advanced into the primary pressure chamber of the master cylinder. The purpose achieved by these provisions is that in the event of a failure of the boosting power, the operating element will act on a piston area whose active cross-sectional area is smaller than the piston area which undergoes the action of the boosting power.

Mounting of the prior-art actuating unit to the splash wall of the automotive vehicle is carried out by means of fixing bolts which are secured to the booster housing and which are inserted through openings in the splash wall and are provided with nuts.

The state-of-the-art arrangement in which the operating element, the vacuum brake power booster, and the master brake cylinder are in series with one another has the following disadvantages:

a) The reaction resulting from the hydraulic pressure which exists within the master brake cylinder is transmitted to the splash wall through the booster housing. As a result, deformations of the booster housing are caused which have a negative effect on the brake system.

b) Expansions are caused by elevated temperatures in the engine compartment and must be balanced by longer actuating travels of the operating element.

c) A relatively large overall axial length results which causes considerable problems as to mounting within the engine compartment.

d) Elevated transverse forces are created during actuation which are absorbed by an outward bending of the piston rod which actuates the valve piston and by the sealing ring guiding and sealing the control housing within the booster housing, which are transmitted to the master brake cylinder, so that they cause problems of guiding in the master cylinder.

e) The tolerances of the elements which participate in the power transmission between the operating element and the master cylinder are stacked.

f) Noises are caused by the aspiration of the air from the passenger compartment.

g) A reduction of the cross-sectional suction area of the air inlet opening in the control valve housing the presence of the piston rod.

SUMMARY OF THE INVENTION

It is, therefore, the object of the present invention to propose an actuating unit of the type described in which the aforementioned disadvantages are largely eliminated and which makes it possible to minimize the actuating travel of the operating element required for the pressure build-up and obtain a reduction in the length of the overall mounting space necessary inside the engine compartment.

In accordance with the invention, this object is achieved by the combination of the following feature: The operating element is arranged to act at an intermediate point between the vacuum brake power booster and the master brake cylinder mounted aligned with each other. Actuation of the power booster control valve take place simultaneously with the actuation of the master cylinder internal piston directly by exerting a pulling force on the control piston by the operating element to activate the control valve so as to generate a differential pressure within the booster pressure chambers. The control valve activating forces act oppositely to the pushing action of the master cylinder actuation force.

A reduction of the cost of manufacture and of mounting simultaneously with a reduction of the weight of the actuating unit are achieved by the invention. Since the booster housing need not transmit any sizable forces and is only required to withstand vacuum boosting forces, it may be made from thin metal sheet or from plastic material. Another advantage offered is constituted by the reduction of the response time and of the time to release the vacuum brake power booster. A particularly compact design of the inventive actuating unit is achieved by furnishing the master cylinder housing with a flange part, the flange part comprising a supporting element for the booster housing and to fix the actuating unit to the splash wall of the automotive vehicle.

Along the lines of another embodiment of the invention, the operating element, preferably the brake pedal, is pivotally supported on the master cylinder housing and is prestressed by means of a spring element in the direction opposed to the sense of actuating rotation The spring element may be provided by a torsion bar spring. A further reduction of weight can be realized by this provision, since the return spring acting on an operator rod for the supply valves actuated by the operator element may be dropped.

In an advantageous development of the subject matter of the invention, an efficient limitation of the travel of the primary piston in the event of its restoring movement is achieved in that in its position of rest the brake pedal is located on an axially adjustable stop on the flange part, to establish a defined position of the primary piston in the release position which is independent of any deformations of the booster housing.

According to another advantageous feature of the invention, a transmission of the force of reaction resulting from the hydraulic pressure which exists in the secondary pressure chamber in the event of a failure of the primary pressure chamber is made possible in that the secondary piston defining the second pressure chamber is of two-part construction, constituted by an external part which interacts with a stop rigid with the housing and which is prestressed by a first return spring and constituted by an internal part which is sealedly guided within said external part and which engages the external part under the action of a second return spring. A major simplification and facilitation of mounting of the inventive actuating unit from the side of the engine compartment of the automotive vehicle can be attained in that the brake pedal is of two-part construction, and is composed of an operating part and an actuating part, the power transmission between said operating part and the actuating part taking place by means of an abutment surface which is provided either at the operating part or at the actuating part.

According to another advantageous design version of the invention, it is envisaged that each one of the two valves in constituted by a screw-in valve assembly within which a first valve sleeve, a second valve sleeve, and an intermediate element disposed between said valve sleeves are positioned, the valve closing me member being formed by a hemispherical end of an actuating pin being guided within the screw-in valve assembly and the intermediate element, which end interacts with the first valve sleeve. The purpose achieved by this provision is that the valves may be supplied and mounted as preassembled component units.

In an aerodynamically favorable, noise-reducing design of the valve piston which actuates the control valve, it is envisaged that the valve piston has a conical configuration on the end facing the air inlet opening.

In another embodiment of the invention, a transmission of the actuating force acting on the brake pedal to the external piston in the event of a failure of the boosting power is rendered possible in that a stud is envisaged in the external piston which is positioned vertically in respect of the latter's axis and which in the event of a failure of the boosting power comes to be abutted against the wall of an oblong hole in the internal piston, the oblong hole and the stud constituting a limitation of the travel of the internal piston in respect of the external piston when the brake is being operated.

Finally, a fail safe shut-off and opening of the valves controlling communication between the fluid reservoir and the master cylinder pressure chambers is assured in a preferred embodiment, in that the actuating pins for the valves are directly coupled to the operating element, i.e., to the brake pedal.

A compact, space-saving solution is offered to the automotive vehicle industry by the present invention. In particular, the axial extension of the assembly as a whole is substantially reduced as compared to state-of-the-art devices. Favorable conditions are created for automated assembly of the inventive actuating unit.

Further detail of the invention will be revealed by the undermentioned description of two embodiments in conjunction with the accompanying drawing.

DETAILED DESCRIPTION

Figure 1:
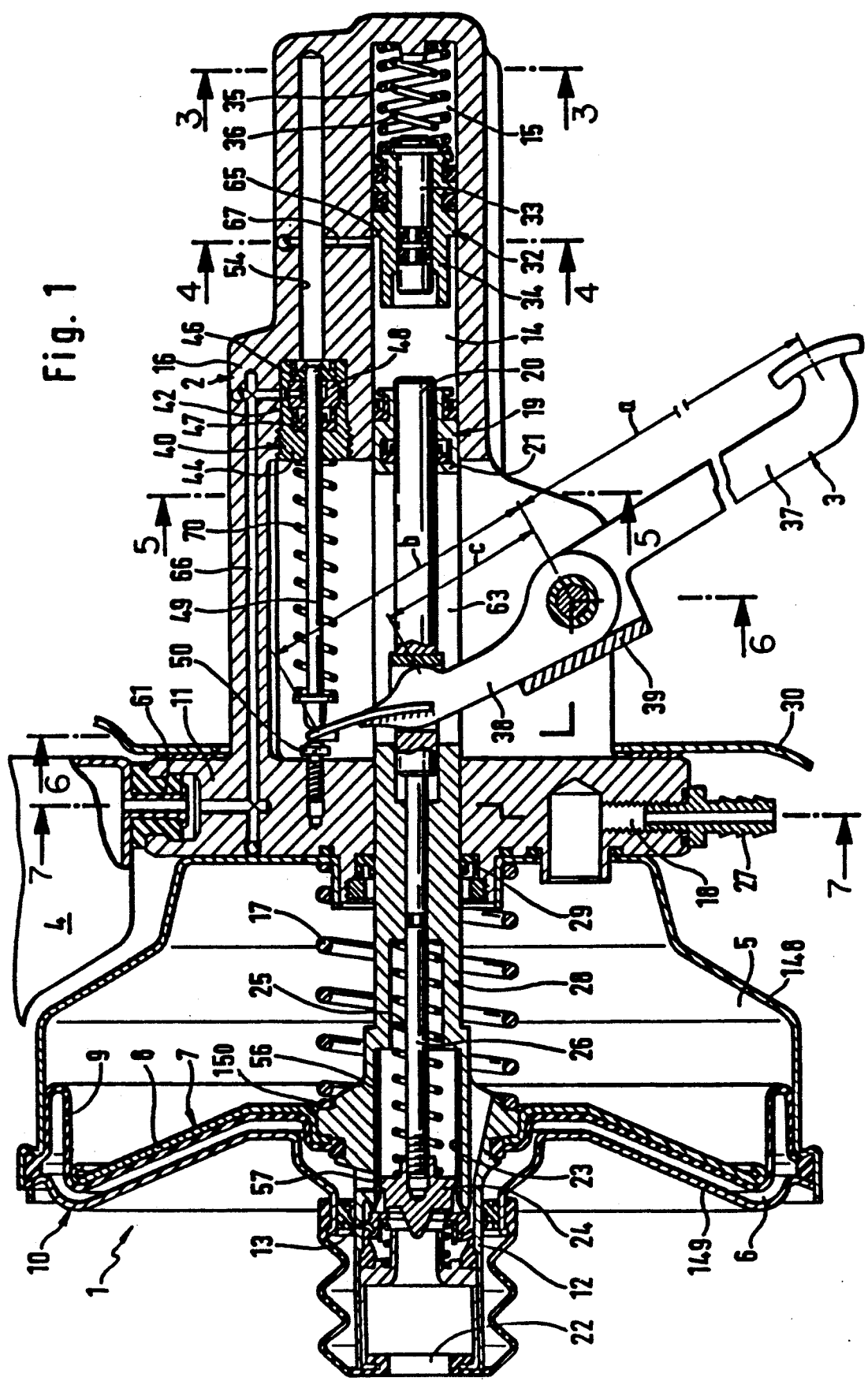
FIG. 1 is a view of a first embodiment of the actuating unit according to the invention in an axial cross section.

The actuating unit shown in FIG. 1 is substantially comprised of a vacuum brake power booster 1, of a master brake cylinder, for example, a tandem master cylinder 2, arranged in series with the vacuum brake power booster 1 and furnished with a flange part 11, and of an operating element, preferably a brake pedal 3 being functionally arranged interposed between the vacuum brake power booster 1 and the tandem master cylinder 2. In this configuration, the flange part 11 is integral with the master cylinder housing 16, and being fixed to the splash wall 30 of the automotive vehicle acts as a supporting element for the vacuum brake power booster 1 and for a hydraulic fluid reservoir 4. The hydraulic fluid reservoir 4 communicates with pressure chambers 14, 15 of the tandem master cylinder 2.

Figure 7:
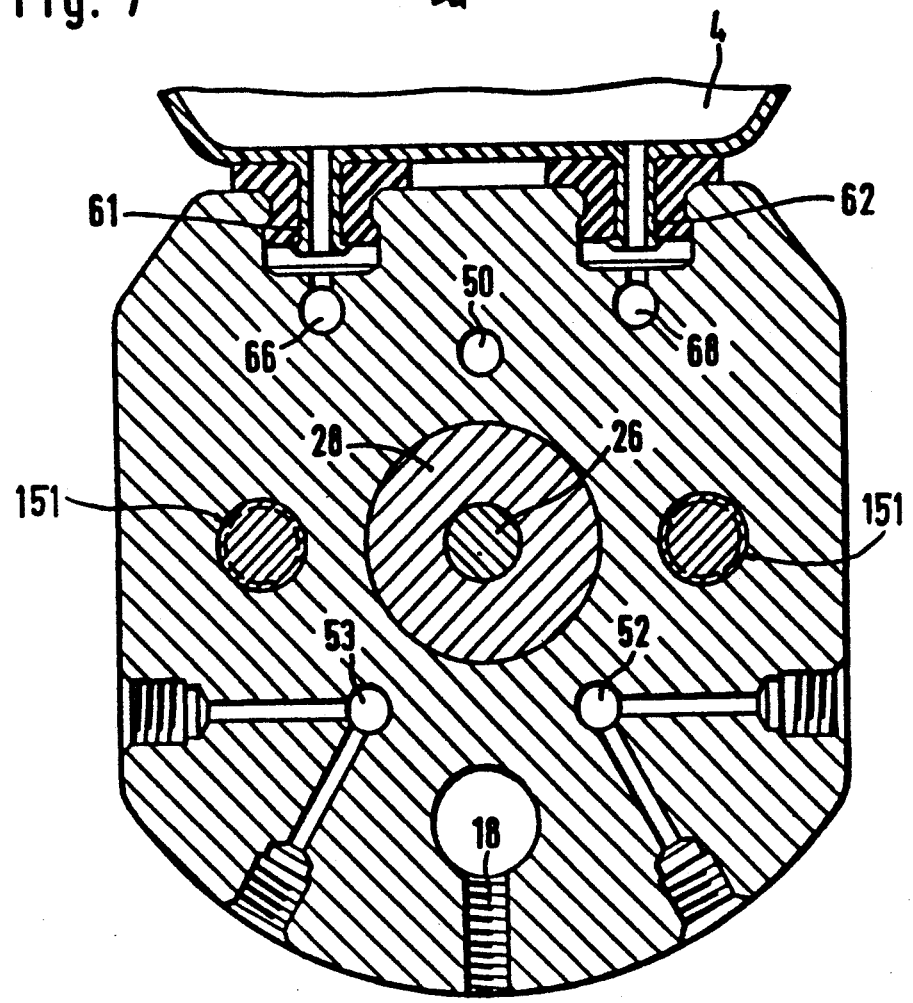
FIG. 7 is an enlarged view of a section taken through the actuating unit according to FIG. 1 along the sectional line 7—7 in FIG. 1.

The vacuum brake power booster 1 is comprised of two cup-shaped housing parts 148, 149 which are assembled with their open sides together to form a booster housing 10. The housing part 148 shown on the right in FIG. 1 is coupled to the flange part 11 by means of fixing pins 151 ( See FIG. 7), while in the lefthand housing part 149, a control valve housing 12 accommodating a control valve 13 and furnished with an air inlet opening 22 is slidingly and sealedly guided.

A movable wall 7 composed of a diaphragmretainer 8 which is fixed to the control valve housing 12 and of a rolling diaphragm 9 adhering to it, divides the inner space of the booster housing 10 into a vacuum chamber 5 and a power chamber 6. The vacuum chamber is evacuatable through a vacuum duct 18 in the flange part 11, and a vacuum connection 27 . The power chamber 6 is aerated by means of the control valve 13 when the operating element 3 is being actuated to create a boosting force acting to the right in FIG. 1

The control valve 13 which as such is state-of-the-art, is actuated by a valve piston 24 being in power-transmitting connection with the operating element 3, the conical end of the valve piston 24 facing the air inlet opening 22.

In order to restore the movable wall 7, a return spring 17 is provided which is clamped between the anterior housing part 148 and an annular surface 150 on the control valve housing 12. The valve piston 24 is guided in a bore 23 provided in the control valve housing 12 and prestressed by means of a compression spring 25. The valve piston 24 is formed with an axial extension 26 which is sealedly guided in an axial extension 28 of the control valve housing 12. The wall of bore 23 is furnished with radial webs 56 which define air guide ducts and which interact with an annular surface 56 on the valve piston 24. The extension 28 is sealed within the flange part 11 by means of a sealing cup 29, and extends into the inner space of the master cylinder housing 16 and forms with its end an external piston 21 part of a primary piston 19. The primary piston 19 defines the primary pressure chamber 14, also has an internal piston 20, formed by the end of the extension 26, being sealedly guided in the external piston 21.

Axially spaced from the primary piston 19 within the master cylinder housing 16 is a secondary piston 32 defining the secondary pressure chamber 15 the secondary piston 32 is also of two-part construction, comprised of an external piston 34 having a larger diameter and of an internal part 33 which is sealedly guided therein.

In the release position, the external piston 34 is urged into abutment against a stationary stop 65 which is provided in the master cylinder housing 16, under the action of a first return spring 35 compressed against the end of the secondary pressure chamber 15. The internal piston 33 is prestressed by means of a second return spring 36 positioned coaxially with the first return spring 35 and is in abutment against the external part 34.

To allow intake of hydraulic fluid into the two pressure 14, 15, the hydraulic fluid reservoir 4 communicates with two reservoir passages 61, 62 formed in the flange part 11 and which also communicate with the primary pressure chamber 14 and with the secondary pressure chamber 15 through hydraulic fluid ducts 66, 67, 68, 69. (See FIGS. 3, 4, and 7.) In addition, the described lead through two axial extensions 54, 55 from two bores 42, 43 extending within the master cylinder housing 16 parallel to the latter's longitudinal axis which accommodate two valves 40, 41 being directly actuatable by the brake pedal 3 (See FIGS. 1 and 5).

Each one of the valves 40, 41 consists of a screw-in valve assembly 44, 45 being threaded into a respective one of the bores 42, 43, which accommodates two valve sleeves 46 and 47, an intermediate element 48 which separates the valve sleeves, and the end of an actuating pin 49, 51 as a valve closing member which is prestressed by a respective compression spring 70 or 71. The other ends of the actuating pins 49, 51 are engaged by the brake pedal 3 under the action of the compression springs 70, 71. The brake pedal 3 is in abutment against an adjustable stop 50 provided in the flange part 11. An adjustment of the brake pedal 3 is thus rendered possible by this measure.

In the embodiment shown in FIG. 1, the brake pedal 3 is supported on the master cylinder housing 16 on a pivot point 60 stationary with the housing. The brake pedal is of two-part construction, composed of an operating part 37 which absorbs the foot effort of the driver and of an actuating part 38 which transmits the force to the internal piston 20, valve piston 24, and to the actuating pistons 49, 51. Preferably, the transmission of the force from the operating part 37 to the actuating part 38 takes place through an abutment surface 39 on the operating part 37, which may, however, be positioned at the actuating part 38 as well.

In this configuration, the dimensions in length of the two parts 37 and 38 are preferably selected such that the distance "a" between the line of action of the actuating force (foot effort) and the pivotal point 60 is considerably larger than the distance "c" between the pivotal point 60, on one hand, and the point of contact between the operating part 38 and internal piston 20, and the point of contact between the actuating part 38 and the actuating pins 49, 51 of the two valves 40, 41.

The two-part design of the brake pedal 3 results in a major facilitation of mounting of the inventive actuating unit. The power-transmitting connection between the two parts 37, 38 can be ensured by appropriate provisions (for example by a pin or by a jacketing bushing).

The mode of functioning of the inventive actuating unit illustrated in FIG. 1 will be described in the following:

In the starting position, with the engine not running and the master cylinder inactivated the two power chambers 5 and 6 are at atmospheric pressure, so that the movable wall 7 is pressure-balanced and is held by the return spring 17 at a stop (not shown in the drawing) and positioned at the rear housing part 149. The position of the stop is preferably selected such that a complete reduction of the pressure existing in the primary pressure chamber 14 is possible int he control case. Since the valve piston 24 is positioned by the stop 50 of the brake pedal 3, the control valve 13 will be in a condition in which the ambient-air sealing seat on the valve piston 24 is open and the vacuum sealing seat at the control valve housing 12 is closed, so that the two power chambers 5 and 6 are isolated from each other. Now, when the first power chamber 5 is evacuated (when the engine is started), then the pressure differential acting on the movable wall 7 will cause the latter to move in the direction of the master brake cylinder 2. As a result, firstly the ambient-air sealing seat will be closed and immediately thereafter the vacuum sealing seat will be opened. Consequently, an evacuation of the second power chamber 6 which will meantime have been shut off from the ambient air will be rendered possible, so that an equilibrium condition is restored again at the movable wall 7 in which both sealing seats of the control valve 13 are closed and the vacuum brake power booster 1 is in a ready position, which is illustrated in FIG. 1. When the brake pedal 3 is operated during braking action, then due to the force exerted, the internal piston 20 jointly with the valve piston 24 will be slid to the right, as a result whereof the control valve 13 will be actuated. A pressure differential proportional to the foot effort will so be brought to bear on the movable wall 7, which generates a boosting power resulting in a movement of the external piston 21 in the direction of actuation. Simultaneously, also, the two actuating pins 49, 51 arranged parallel to each other and making part of the two valves 40, 41 will be slid int he closing direction, so that the connection between the primary pressure chamber 14 and the secondary pressure chamber 15 and the unpressurized hydraulic fluid reservoir 4 will be interrupted.

Figure 3:
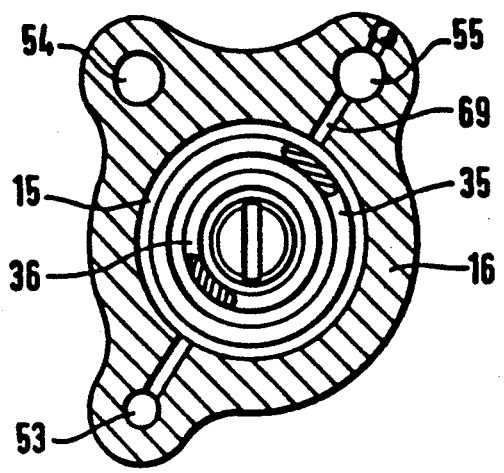
FIG. 3 is an enlarged view of a section taken through the actuating unit according to FIG. 1 along the sectional line 3—3 in FIG. 1.
Figure 4:
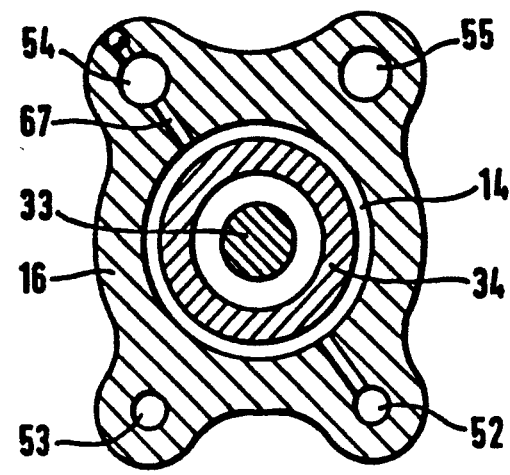
FIG. 4 is enlarged view of a section taken through the actuating unit according to FIG. 1 along the sectional line 4—4 in FIG. 1.
Figure 5:
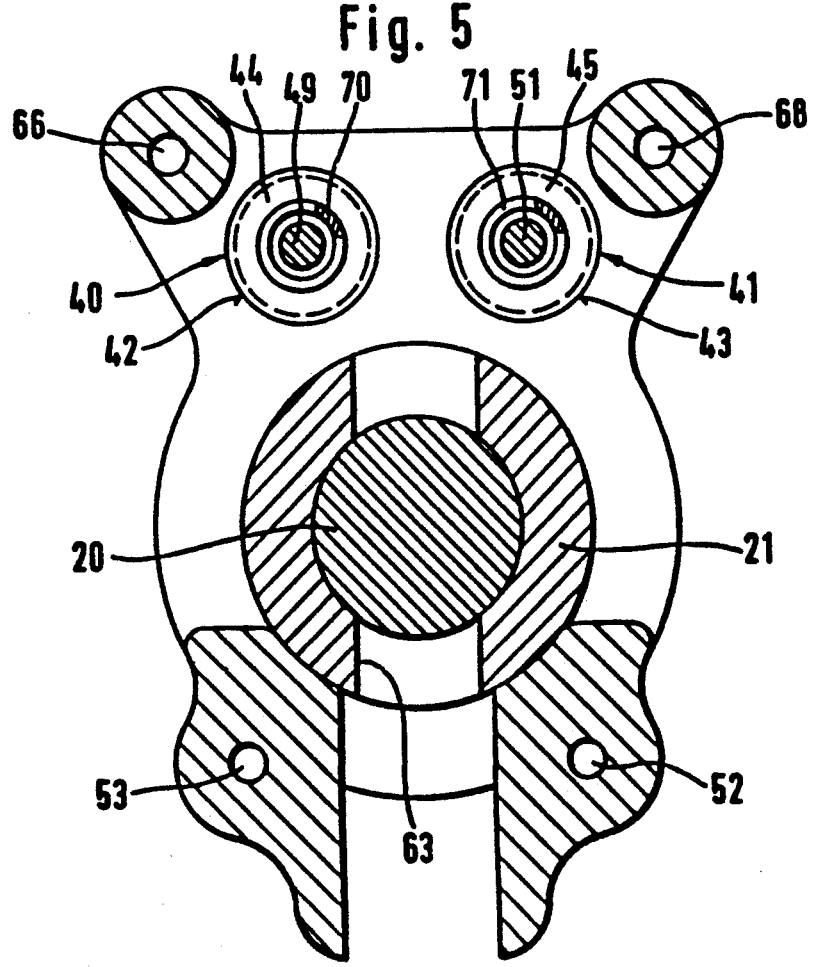
FIG. 5 is an enlarged view of a section taken through the actuating unit according to FIG. 1 along the sectional line 5—5 in FIG. 1.
Figure 6:
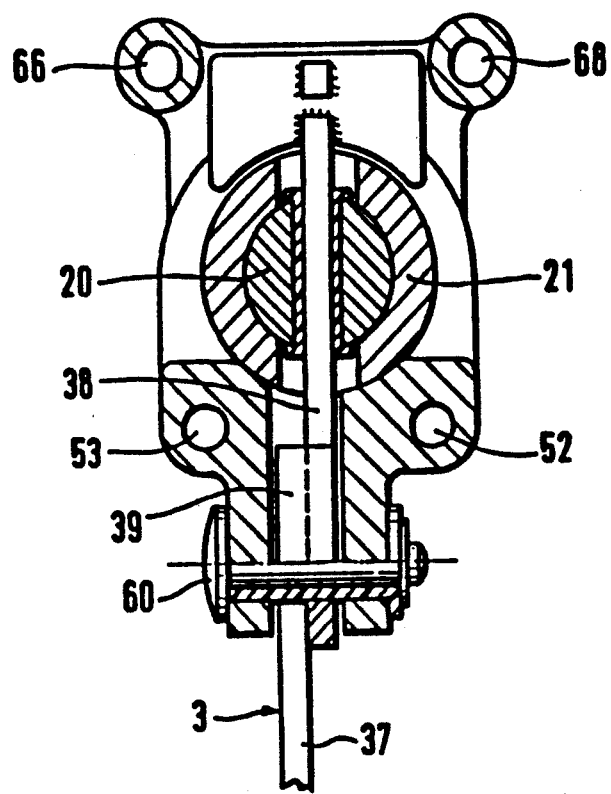
FIG. 6 is an enlarged view of a section taken through the actuating unit according to FIG. 1 along the sectional line 6—6 in FIG. 1.

Due to the forward movement o the primary piston 19, comprised of the internal piston 20 and the external piston 21, a hydraulic pressure is built up in the primary pressure chamber 14 which also results in a build-up of pressure int eh secondary pressure chamber 15. This allows pressurized fluid flow to to the individual wheel brakes through brake lines (not shown int he drawing) and connected to hydraulic ports 52, 53 (FIGS. 3, 4).

In the vent of a failure of the vacuum (failure of the vacuum source) required for creating the pressure differential brought to bear int he booster housing 10 upon operation of the brakes which results in a failure of the boosting power, the movable wall 7 will remain in its position under the action of the return spring 17 A recess or slot 63 is provided in the external piston 21 which allows advance of the internal piston 20 in the direction of actuation.

Figure 2:
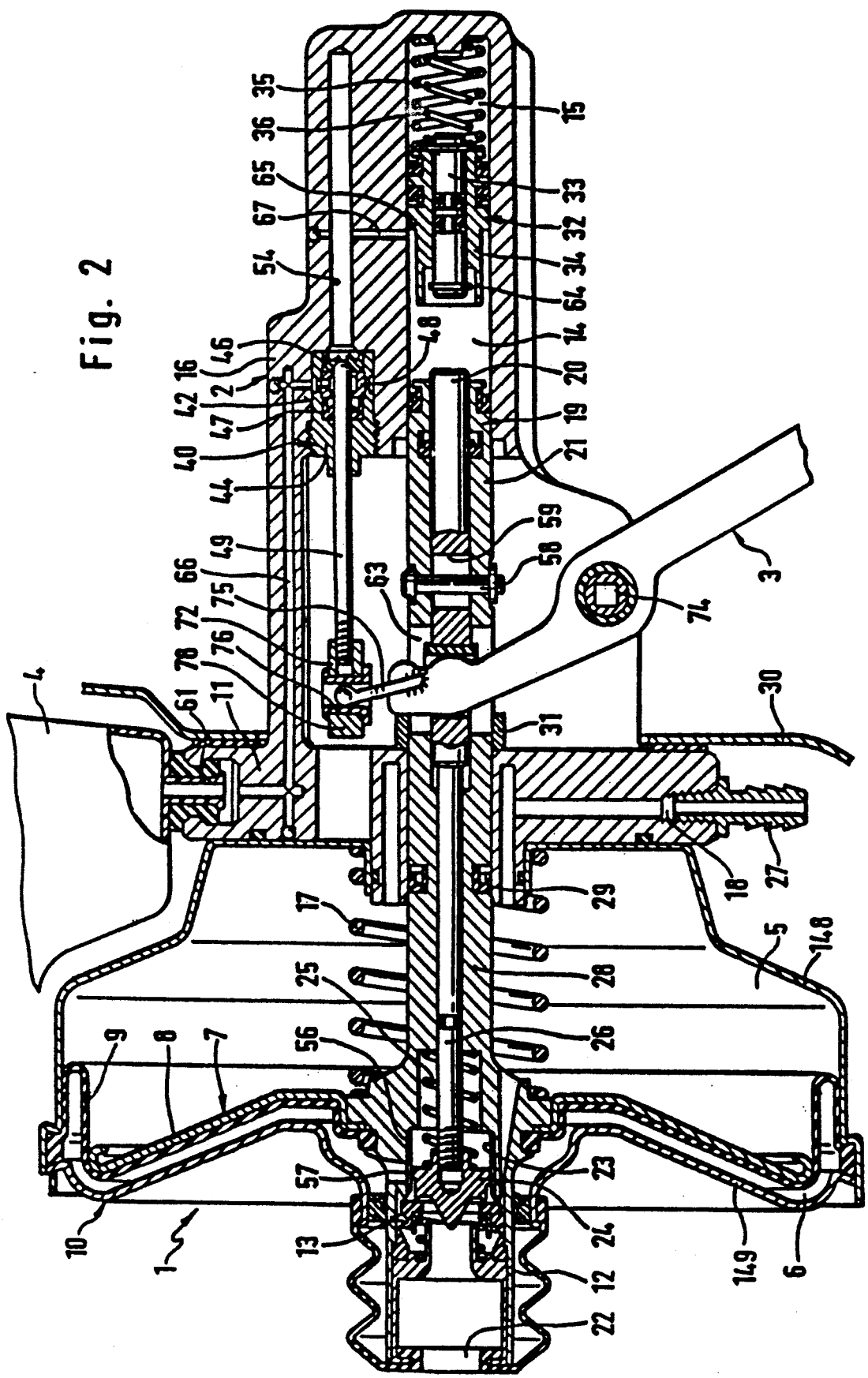
FIG. 2 is an axial cross section view of a second embodiment of the actuating unit in accordance with the invention.

In the design version shown in FIG. 2, the operating element is comprised of the brake pedal 3 of a one piece construction and engages the flange part 11 by means of a bushing 31 pushed onto the external piston 21 and is prestressed contrary to the actuating direction by a spring element 74 forming the pivotal point 60, which spring element 74 may, for example, take the form of a torsion bar spring. In this design version, the actuating pins 49, 51 (51 not shown in FIG. 2) are coupled to the brake pedal 3, so that upon the withdrawal of the actuating force they will be restored into their starting position by the action of the spring element 74. The coupling is realized by means of an actuating arm 75 which is positioned at the end of the brake pedal 3, being, for example, welded to the brake pedal 3 and whose end preferably having a spherical shape is slidingly guided in a guide 76. In this context, the guide 76 is inserted button-shape in an actuating plate 78 which is furnished with tow threaded bushings 72, only one of which is illustrated in FIG. 2. Threaded into the threaded bushings 72 are the ends of the actuating pins 49, 51, so that their active length and, thus, the valve play may be exactly adjusted.

In the vent of a failure of the boosting power, in order to be able to transmit the actuating force acting on the brake pedal 3 also to the external piston 21, the external piston 21 is furnished with a stud 58 being disposed at right angles with the axis and extending radially through an oblong hole 59 int eh internal piston 20. In the event of an actuation without boosting power, the wall of the oblong hole 59 will come to be abutted against the stud 58, so that the external piston 21 will be advanced with the internal piston 20.

In the event of a failure of the primary pressure chamber 14, a transmission of the force required for the generation of a hydraulic pressure in the secondary pressure chamber 15 to the secondary piston 32 takes place by direct mechanical contact between the latter and the primary piston 19. If in the event of a failure of the primary pressure chamber 14, the boosting power should also fail at the same time, then the external part 34 will be engaged by means of a force transmitting element 64 which is positioned at the end of the internal part 33.

What is claimed is:

1. An actuating unit arrangement of a hydraulic brake system, for an automotive vehicle having an engine compartment defined by a splashwall, said arrangement comprising:
    a brake pedal;
    a master cylinder including a master cylinder housing formed with a bore, a primary piston slid ably mounted in said bore and defining therein a primary pressure chamber; a supply means for filling said primary pressure chamber with hydraulic fluid;
    a power booster comprising a booster housing aligned and mounted to said master cylinder housing, said booster housing defining an interior space, a movable wall dividing said interior space into a power chamber and a vacuum chamber;
    fluid connection means for applying a vacuum in said vacuum chamber;
    control valve means for alternatively communicating vacuum or air pressure into said power chamber to create a controllable differential pressure between said vacuum chamber and said power chamber and a corresponding boosting force on said movable wall, said control valve means including a control housing fixed to said movable wall and a control piston slidably mounted within said control housing, advance of said control piston towards said master cylinder causing increased differential pressures and consequent increased boosting forces;
    said primary piston comprising an external piston slidable in said master cylinder bore and an internal piston slidable within said external piston;
    said control valve housing including an extension portion connected to said external piston;
    an axially extending member slidable within said control valve housing extension portion connecting said control piston to said internal piston;
    an elongated opening extending into said control valve housing extension portion at a point intermediate said booster housing and said master cylinder, exposing said axial extension member; and
    an operating element movable by said brake pedal extending into said elongated opening and driveingly engaging said axially extending member to enable pushing advance of said internal piston into said master cylinder and pulling advance of said control piston to generate a boosting force exerted on said external piston by said control valve housing extension portion.

2. The actuating unit arrangement according to claim 1 wherein said master cylinder housing includes a flange portion affixed to said splashwall; said master cylinder housing formed with a main portion having said bore formed therein projecting through said splashwall and out of said engine compartment.

3. The actuating unit arrangement according to claim 2 wherein said booster housing is disposed in the engine compartment side of said splashwall.

4. The actuating unit arrangement according to claim 3 wherein said control valve housing includes an end portion comprising an air intake for admitting atmospheric air projecting from said booster housing in a direction away from said master cylinder and into said engine compartment.

5. The actuating unit arrangement according to claim 4 wherein said control piston is formed with a conical end projecting into said air intake.

6. The actuating unit arrangement according to claim 2 wherein said supply means includes a fluid reservoir mounted to said flange portion and within said engine compartment, and passage means extending through said master cylinder housing to said primary pressure chamber, and supply valve means in said master cylinder main portion controlling flow of fluid into said primary pressure chamber.

7. The actuating unit arrangement according to claim 6 wherein said supply valve means includes an actuating pin received in said master cylinder housing main portion and projecting towards said flange portion, a space lying between said master cylinder main portion and said flange portion into which said actuating pin projects, said operating element including a portion extending into said space and engaging said actuating pin whereby said operating element also operates said supply valve.

8. The actuating unit arrangement according to claim 7 further including a return spring urging said actuating pin and said operating element to a reset position.

9. The actuating unit arrangement according to claim 7 wherein said operating element is pivotally mounted and acting on said operating element urging said operating element into a pivoted return position.

10. The actuating unit arrangement according to claim 9 wherein said spring means comprises a torsion spring.

11. The actuating unit arrangement according to claim 1 wherein said operating element is pivotally mounted to said master cylinder housing.

12. The actuating unit arrangement according to claim 11 wherein said brake pedal is a separate member from said operating element and also is pivotally mounted for pivoting about the same pivot axis of said operating element, one of said brake pedal or operating element formed with an abutment to cause pivoting of said operating element by pivoting of said brake pedal.

13. The actuating unit arrangement according to claim 11 further including an extension portion fixed to said operating element and extending through said openings in said control valve housing extension portion and said axially extending member, and a stop fixed with respect to said master cylinder housing engaging said extension portion at a return position of said operating element.

14. The actuating unit arrangement according to claim 13 wherein said brake pedal is mounted for pivoting about the same pivot axis as said operating element, and means pivoting said operating element by pivoting of said brake pedal.

15. The actuating unit arrangement according to claim 13 wherein said brake pedal has a point of application of foot effort and wherein the distance from said pivot axis to said point of application of foot effort is substantially larger than the distance from said pivot axis to the location of said driving engagement with said axially extending member.

16. The actuating unit arrangement according to claim 1 wherein said opening in said axially extending member provides sufficient clearance for actuating movement of said operating element and said internal piston independently of said control valve housing and said external piston, whereby upon failure of vacuum unassisted actuation is enabled.

17. The actuating unit arrangement according to claim 16 further including a secondary master cylinder piston slidable in said bore and defining a secondary pressure chamber, said secondary piston including an external piston slidable in said bore and an internal piston slidable in said external piston, said internal piston of said primary piston engagable with said internal piston of said secondary piston upon failure of pressure in said primary pressure chamber.

18. The actuating unit arrangement according to claim 17 further including stop means engaging said external and internal pistons of each of said primary and secondary pistons after a predetermined relative travel to enable unassisted actuation of both upon failure of said power booster.

* * * * *